(12) United States Patent
Rosenbluth

(10) Patent No.: US 6,636,276 B1
(45) Date of Patent: Oct. 21, 2003

(54) PROJECTION DISPLAY SYSTEM WITH AT LEAST TWO REFLECTIVE LIGHT VALVES

(75) Inventor: Alan Edward Rosenbluth, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/392,957

(22) Filed: Sep. 9, 1999

(51) Int. Cl.[7] .......................................... G02F 1/1335
(52) U.S. Cl. ..................... 349/8; 349/5; 349/9; 353/33; 353/34
(58) Field of Search ....................... 349/5, 8, 9; 353/39, 353/33, 20

(56) References Cited

U.S. PATENT DOCUMENTS

| | | | | |
|---|---|---|---|---|
| 5,786,934 A | * | 7/1998 | Chiu et al. | 359/494 |
| 6,113,239 A | * | 9/2000 | Sampsell et al. | 353/31 |
| 6,183,091 B1 | * | 2/2001 | Johnson et al. | 353/20 |
| 6,273,567 B1 | * | 8/2001 | Conner et al. | 353/20 |
| 6,388,718 B1 | * | 5/2002 | Yoo et al. | 349/9 |
| 6,390,626 B2 | * | 5/2002 | Knox | 353/20 |

* cited by examiner

Primary Examiner—Robert H. Kim
Assistant Examiner—Andrew Schechter
(74) Attorney, Agent, or Firm—Scully, Scott, Murphy & Presser; Robert M. Trepp, Esq.

(57) ABSTRACT

A projection display system includes a light source, wavelength-selective retarder device, first and second reflective light valves (LVs), a polarizing beam splitter (PBS), and a wavelength-selective filtering device. The wavelength-selective retarder device receives a uniformly polarized light from the light source and produces a first dark-state light having a first polarization state at a first set of wavelengths and a second dark-state light having a second polarization state at a second set of wavelengths. The first LV receives the first dark-state light and produces a first bright-state light by rotating the polarization from the first polarization state to the second polarization state. The second LV receives the second dark-state light and produces a second bright-state light by rotating the polarization from the second polarization state to the first polarization state. The PBS, positioned between the wavelength-selective retarder device and the first and second LVs, directs the first and second dark-state lights to the first and second LVs respectively, and also directs the first and second bright-state lights to a screen. A wavelength-selective filtering device receives the first and second bright-state lights from the PBS and substantially reduces a residual dark-state light.

40 Claims, 12 Drawing Sheets

| # | ORIENTATION (DEGREES) | RETARDANCE (MICRONS) |
|---|---|---|
| 1 | 113.36 | 1.88 |
| 2 | 98.50 | 0.47 |
| 3 | -16.93 | 2.18 |
| 4 | -34.91 | 3.28 |
| 5 | 11.69 | 1.07 |
| 6 | 65.95 | 0.52 |
| 7 | -52.06 | 0.69 |

| # | ORIENTATION (DEGREES) | RETARDANCE (MICRONS) |
|---|---|---|
| 1 | 88.18 | 3.30 |
| 2 | 19.35 | 3.44 |
| 3 | -47.00 | 1.87 |
| 4 | 16.11 | 0.54 |
| 5 | -45.33 | 2.09 |
| 6 | 20.09 | 2.04 |

| # | ORIENTATION (DEGREES) | RETARDANCE (MICRONS) |
|---|---|---|
| 1 | 22.57 | 2.93 |
| 2 | 114.73 | 4.04 |
| 3 | 170.10 | 4.36 |
| 4 | 51.62 | 1.69 |
| 5 | 78.12 | 2.62 |
| 6 | 14.23 | 1.55 |
| 7 | -11.64 | 1.73 |

| # | ORIENTATION (DEGREES) | RETARDANCE (MICRONS) |
|---|---|---|
| 1 | 65.98 | 1.57 |
| 2 | 91.74 | 0.88 |
| 3 | 60.41 | 1.19 |
| 4 | 124.31 | 2.83 |
| 5 | -0.48 | 2.75 |
| 6 | -56.87 | 0.92 |
| 7 | -75.13 | 1.42 |

PROJECTION DISPLAY SYSTEM WITH AT LEAST TWO REFLECTIVE LIGHT VALVES

BACKGROUND OF THE INVENTION

1. Field of the Invention

The present invention generally relates to a high-performance projection display system using at least two reflective light valves and a light splitting and combining device, typically a polarizing beam splitter, and more particularly to a projection display system which uses a wavelength-selective retarder device to project high contrast images from reflective light valves to and from which lights go through two faces of the light splitting and combining device.

2. Discussion of Related Art

Reflective liquid crystal on silicon (LCOS) imagers are expected to become the lowest cost light valve (LV) technology for such applications as high definition television (HDTV), advanced television (ADTV), and monitors of medium-to-large diagonal about 28 inches or more. Though mature LCOS technology is expected to be cheaper than competing digital micro mirror device (DMD) and polysilicon technologies, its adoption is hampered at present by limitations which its reflective mode of operation imposes on projection optics.

These limitations may be understood as follows: A light which is unchanged in direction or polarization upon reflection from a reflective LV will necessarily retrace its path back to the light source due to the intrinsic reversibility of efficient passive optical elements. A light that remains in the illumination state is thus unable to contribute to the image. Each reflective light valve must therefore be illuminated in a dark-state light, and space must be provided above the light valve to separate the light which the LV converts to a bright state from the dark state. With LCOS light valves this separation is most commonly accomplished by a polarizing beam splitter (PBS), as shown in FIG. 1. An illumination light supplied by a light source 10 enters one face (i.e. one port or channel) 12a of the PBS 12 and is redirected by a polarizer-coated PBS hypotenuse 14 (for example in reflection as shown in FIG. 1) to a second channel 12b of the PBS, where it illuminates one or more reflective light valves 16. The bright-state light returned from these light valves is then passed by the hypotenuse coating 14 (for example in transmission) to exit the PBS through a third face 12c. A dark-state returned light is reflected by the hypotenuse coating 14 and returns to the source 16.

One problem with the PBS arrangement shown in FIG. 1 is that it forces separation of the light valve from a projection lens, so that a more complex lens is required for high-quality imaging. It is therefore desirable to minimize the space impact of the PBS. Moreover, when the projector employs multiple light valves, it is desirable to deploy the associated PBS's as efficiently as possible. A particular inefficiency of the arrangement shown in FIG. 1 is that only three of the four available PBS faces or ports are used. This in turn increases the complexity of a system that employs the subsystem of FIG. 1 to project color images from multiple light valves. For example, FIG. 2 shows a prior art arrangement in which three PBS's 20, 21, 22 associated with three Lvs 23, 24, 25 (one for each of the red [R], green [G], and blue [B] colors) are integrated into a projection display system using a number of color separating and combining dichroics 26, 27, 28. Each LV has a dedicated PBS, and the layout becomes fairly complex because the separating and combining dichroics 26, 27, 28 must essentially wrap the light around these PBS's 20, 21, 22. In practice, additional lenses (not shown) must be added to accommodate the differing lengths of the various paths taken by the light.

A different example is shown in FIG. 3, comprising a prior art optical system in which R, G, and B lights are alternately delivered to a single light valve 30 by using a light wheel 32 positioned between a light source 34 and a PBS 36. Though the system of FIG. 3 is simple optically, the light valve 30 is not used in an efficient way because only one color is projected at a given time. Alternative versions of the FIG. 3 system use, for example, a telecentric pair of micro-lens arrays, or scanning illumination optics, to simultaneously deliver the R, G, and B illumination bands to spatially separated sub-pixels in the light valve. Here the inefficiency manifests itself in the constraint that only one-third of light valve area can be made available for each color.

U.S. Pat. No. 5,517,340 (hereinafter the '340 patent), issued on May 14, 1996 to Doany et al. and hereby incorporated by reference, discloses a more efficient use of the PBS than the arrangement of FIG. 3. As shown in FIG. 4, which is a reproduction of FIG. 6 of the '340 patent, one can make use of two channels of a PBS to illuminate light valves. The embodiment shown in FIG. 4 uses a "squirrel-cage" configuration for the color wheel, rather than the disk shown in FIG. 3. In the arrangement of FIG. 4, a green light is always introduced in P polarization state. In other words, for green wavelengths the incident electric field is always polarized within the plane of the figure. The green light is thus directed through the PBS hypotenuse to illuminate the light valve at the right face of the PBS which is dedicated to green image information. Red and blue lights are always introduced in S polarization state. That is, red and blue lights are polarized perpendicular to the plane of incidence. More precisely the S polarized component of the illumination light is alternately switched in color between red and blue. Red and blue lights are therefore reflected by the PBS coating to the light valve at the top face of the PBS, which is alternately loaded with red and blue image information. Or, the red/blue illumination and the loading of red/blue image information can be scrolled along the light valve in a synchronous fashion.

The goal of the system shown in FIG. 4 is to encode one set of colors or wavelengths of the illumination light in P polarization, in order that the PBS hypotenuse coating illuminates one LV in transmission with these colors, while encoding a second set of colors or wavelengths in S polarization, in order to illuminate a second LV in reflection. This assumes a PBS of the conventional kind where the hypotenuse coating reflects S polarization and transmits P.

However, a problem with the system of FIG. 4 is that when illuminating light is returned from the green light valve in dark state, the hypotenuse coating of the PBS will inevitably reflect several percent of the dark state light out the bottom exit face of the PBS and onward to a projection screen. This is because a practical hypotenuse coating of the PBS is not capable of entirely transmitting back through to the source the green light that remains in the dark state upon reflection from the green LV. Available hypotenuse coatings will instead have a residual reflectivity in P polarization of at least a few percent averaged over practical angular ranges. Thus, the image will contain non-negligible residual green intensity even when the green light valve is in the black state, and contrast of the image will be degraded accordingly. The PBS also directs unwanted P-polarized green light onto the red/blue LV, further contributing to the residual dark-state intensity. One might contemplate putting a cleanup polarizer in the bottom output face to reduce the residual dark-state P polarization while passing bright-state S polarization, but unfortunately these polarization assignments are reversed for the red and blue lights. That is, for red and blue colors or wavelengths, P polarization is the bright state and thus cannot be reduced. A PBS operating in transmission can usually by itself adequately reduce the residual S-polarized light without a cleanup polarizer. Thus in the layout of FIG. 4 high contrast can be provided in red and blue if the input red and blue lights are purely S polarized, but the problem of low green contrast remains.

The '340 patent describes one method for improving contrast in the optical system of FIG. 4. In accordance with the improved method, a light valve dedicated to red and green is alternately illuminated in reflection with S-polarized red and green illumination, while a blue light valve is illuminated in transmission with P-polarized blue light; a color filter is positioned in front of the red/green light valve to screen it from mis-reflected P-polarized blue illumination. However, this method still provides poor contrast from the blue light valve, due to the aforementioned limitations of the PBS in filtering the dark state P polarization in reflection.

Another solution is to use a total-internal-reflection (TIR) prism and oblique illumination instead of a PBS, as disclosed in the U.S. patent application Ser. No. 085,065 entitled "Lightvalve Projection System in which red, green and blue image subpixels are projected from two light valves and recombined using total reflection prisms" filed on May 27, 1998. This, however, requires that the solid angle of the projection lens be doubled (if rotationally symmetric), that the illumination and collection optics be corrected for a semicircular pupil, and in addition that the hypotenuse coating be phase corrected to avoid compound angle depolarization. This coating must also be designed to minimize the dead band imposed by the impossibility of achieving a perfectly sharp transition between angles of near-unity transmittance and the TIR regime. In other words, at angles sufficiently close to critical, the coating can no longer provide good antireflection.

International patent application NO. WO9707418 entitled "Thin Film Polarizing Device" and published on Feb. 27, 1997, discloses a PBS element based on frustrated total reflection that can provide reasonably good contrast in both S and P polarizations. However, this element operates at a very steep angle of incidence, about 70 degrees incidence at the hypotenuse, making the PBS element large in at least one axis, departing quite far from a cubic shape, which ultimately imposes on the illumination and projection lenses about a doubling of the optical working distance, significantly increasing cost. Also, the extinction ratio provided by these beam splitters, though better than that of conventional PBS cubes used in two channels, is insufficient for some applications.

SUMMARY OF THE INVENTION

Accordingly, it is an object of the present invention to provide a projection display system having a PBS and using at least one light valve positioned at a face of the PBS for a set of wavelengths and another at least one light valve at another face for another set, without sacrificing contrast in any color.

In accordance with the teachings herein, the present invention provides a projection display system which includes a light source adapted to supply an illumination light having a common polarization at first and second sets of wavelengths. A wavelength-selective retarder device is positioned to receive the illumination light from the light source and to produce a first dark-state light having a first polarization state at the first set of wavelengths and a second dark-state light having a second polarization state at the second set of wavelengths. A first reflective light valve device is adapted to receive the first dark-state light and to produce a first bright-state light by rotating the polarization from the first polarization state to the second polarization state. A second reflective light valve device is adapted to receive the second dark-state light and to produce a second bright-state light by rotating the polarization from the second polarization state to the first polarization state. A light splitting and combining device is positioned between the wavelength-selective retarder device and the first and second reflective light valve devices. The light splitting and combining device is adapted to receive the first and second dark-state lights from the wavelength-selective retarder device and to direct the first and second dark-state lights to the first and second reflective light valve devices respectively, and is also adapted to receive the first and second bright-state lights reflected from the first and second reflective light valve devices respectively and to direct the first and second bright-state lights to a screen. A wavelength-selective filtering device is positioned to receive the first and second bright-state lights from the light splitting and combining device and to substantially reduce a residual dark-state light. An image light to be projected onto the screen is thus produced.

In one embodiment of the present invention, the wavelength-selective retarder device comprises a retarder stack adapted to rotate the polarization of the illumination light at either the first or second sets of wavelengths by 90 degrees.

In another embodiment of the present invention, the wavelength-selective filtering device comprises a wavelength-selective retarder adapted to rotate the polarization of either the first or second bright-state light by 90 degrees so that the first and second bright-state lights have a common polarization, and a linear polarizer adapted to substantially eliminate a light having a polarization orthogonal to the common polarization.

In another embodiment of the present invention, the wavelength-selective filtering device comprises a first wavelength-selective polarizer adapted to block a light having the first polarization state at the second set of wavelengths while passing other lights having a polarization different from the first polarization or having a wavelength out of the second set of wavelengths. In this embodiment, the wavelength-selective filtering device may further comprise a second wavelength-selective polarizer adapted to block a light having the second polarization state at the first set of wavelengths while passing other lights having a polarization different from the second polarization or having a wavelength out of the first set of wavelengths.

In a further embodiment of the present invention, the wavelength-selective retarder device comprises a retarder stack adapted to rotate the polarization of the illumination light at either the first or second sets of wavelengths by 90 degrees. The retarder stack is followed by a wavelength-selective polarizer adapted to block a light having the second polarization at the first set of wavelengths. In turn, the wavelength-selective filtering device comprises a wavelength-selective polarizer adapted to block a light having the second polarization at the second set of wavelengths. The wavelength-selective polarizer is followed by a combination of a retarder stack adapted to rotate the polarization of either the first or second bright-state light by 90 degrees so that the first and second bright-state lights have a common polarization, and a linear polarizer adapted to substantially eliminate a light having a polarization orthogonal to the common polarization.

In a still another embodiment of the present invention, a first color filter is positioned between the light splitting and combining device and the first reflective light valve device. The first color filter is adapted to absorb a light having a wavelength within the second set of wavelengths while passing a light having a wavelength within the first set of wavelengths. A second color filter is positioned between the light splitting and combining device and the second reflective light valve device. The second filter is adapted to absorb a light having a wavelength within the first set of wavelengths while passing a light having a wavelength within the second set of wavelengths. In another embodiment of the present invention, the assignment of the first and second sets of wavelengths to the first and second reflective light valve devices is switched sequentially in time.

In a further embodiment of the present invention, the wavelength-selective retarder device comprises a tilted dichroic mirror, a tilted quarterwave retarder stacked over the tilted dichroic mirror, and a tilted mirror stacked over the tilted quarterwave retarder. The wavelength-selective retarder device may further comprise an untilted wavelength-selective linear polarizer positioned between the tilted dichroic mirror and the polarized beam splitter.

In all embodiments described above, the light splitting and combining device may have a first face adapted to receive the illumination light from the light source, a second face adapted to output the first and second bright-state lights, a third face adapted to output the first dark-state light directed to the first reflective light valve device and to receive the first bright-state light reflected from the first reflective light valve device, and a fourth face adapted to output the second dark-state light directed to the second reflective light valve device and to receive the first bright-state light reflected from the second reflective light valve device.

It is noted, in all preceding embodiments, at least either one of said first and second reflective light valve devices may include a plurality of reflective light valves.

BRIEF DESCRIPTION OF THE DRAWING

These and other features, aspects, and advantages of the present invention will become better understood with regard to the following description, appended claims, and accompanying drawings where:

DETAILED DESCRIPTION OF THE PREFERRED EMBODIMENT

Figure 5:
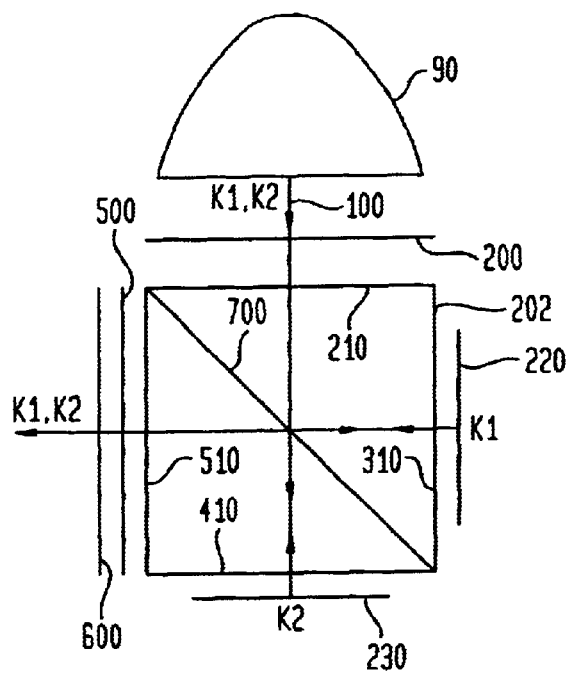
FIG. 5 illustrates an embodiment of a projection display system according to the present invention.

In the configuration of FIG. 5, an illumination light 100 supplied by a light source 90 is assumed to be uniformly polarized in S state. The incident S polarized illumination light 100 passes through wavelength-selective retarder device 200 positioned between the illumination source 90 and a face 210 of a PBS 202. The retarder 200 produces a dark-state light by rotating the polarization of the light 100 at colors K2 to P state while leaving colors K1 in S state. K1 may represent a set of wavelengths, for example, red and blue color bands, while K2 may represent green.

A polarizing coating 700 directs a dark-state light having S polarization state at the K1 wavelengths to a face 310. A first reflective light valve device, which is a single reflective light valve 220 associated with the K1 color information, is thus illuminated by the dark-state light. When the light valve 220 reflects back the dark-state light, it produces a bright-state light at its pixels with an electrical signal applied, by rotating the polarization from S state to P state. Similarly, another dark-state light having P polarization state at the K2 wavelengths exits face 410 to address a second reflective light valve device, which is a single reflective light valve 230 assigned to the K2 color information in this embodiment. When the light valve 230 reflects back the illuminating light, it may either leave it in dark state, or convert it to bright-state light at its pixels based on an electrical signal applied, by rotating the polarization from P state to S state. At faces 310 and 410 quarterwave retarders (not shown) may be positioned to correct compound angle depolarization.

In the present embodiment, a single light valve 220 is provided for red and blue color bands. These color bands may be separated by time-sequential separation technique using a light wheel as disclosed in the '340 patent or spatially by means of a color filter array, optionally including tilted dichroics and a double microlens array for telecentric illumination of red and blue subpixels. Note that separate light valves may be used for red and blue. In such a case, a macroscopic dichroic filter is positioned between the PBS and the light valves for red and blue lights.

Lights whose polarizations are unrotated when reflected by the light valves 220 and 230, with S polarization for the K1 color band and P for the K2 color band, are directed by the coating 700 in reflection for the S polarized light and in transmission for the P polarized light. Thus the unrotated lights are returned through the face 210 back to the light source 90. The bright-state lights, with P polarization state at the K1 wavelengths and with S polarization state at the K2 wavelengths, will be directed by the coating 700 in transmission for the P polarized light and in reflection for the S polarized light. Thus the bright-state lights produced by the light valves 220 and 230 are both directed to a wavelength-selective filtering device which in this embodiment comprises a combination of a dichroic retarder 500 on an output face 510 of PBS 202 and a cleanup linear polarizer 600. An image light to be projected onto a screen (not shown) is thus produced.

The dichroic retarder 500 renders all residual dark-state light in the various color bands to a common polarization status that is orthogonal to that to be passed by the cleanup polarizer 600 which substantially reduces the residual dark-state light from contributing to the image light. For example, the retarder 500 may rotate the polarization of the residual dark-state light for the K2 wavelengths to P state, while leaving the residual dark-state P polarized light for K1 wavelengths unchanged. The cleanup linear polarizer 600 then eliminates the residual dark-state lights which are now P polarized in all colors from the image light.

In the present embodiment, it is assumed that the illumination light 100 from the light source 90 has S polarization status at K1 and K2 wavelengths. It is noted that the illumination light may have P polarization status at K1 and K2 wavelengths. In such a variation, the light valve 230 is assigned to K1 wavelengths and the light valve 220 to K2.

Figures 6A, 6B:
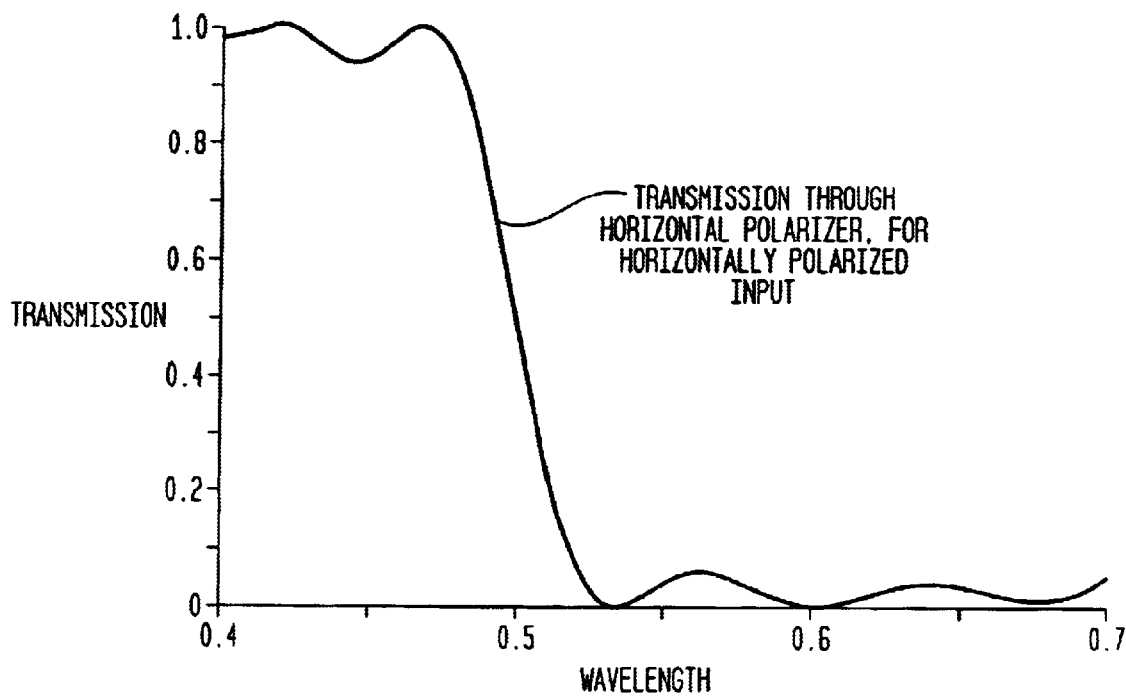
FIG. 6a shows a sequence of retarder films that constitute a wavelength-selective retarder device.
FIG. 6b shows intensity output from the retarder stack of FIG. 6a when followed by a horizontal analyzing polarizer.

The design of wavelength-selective retarders such as the ones 200 and 500 is well known to those skilled in the art or exemplified in Harris et al., in "Optical Network Synthesis Using Birefringent Crystals I. Synthesis of Lossless Networks of Equal-Length Crystals," J. Opt. Soc. Am. 54(10), p.1267, (1964). They are based on the principle that when a very short pulse (effectively a temporal impulse function) of broadband linear polarized light is incident on a birefringent layer whose F and S axes are oriented at an angle to the polarization direction, the slower propagation speed of excitations along the S axis causes the output impulse response to take the form of a double-pulse; a first output pulse polarized along the F axis, followed by a delayed orthogonal pulse polarized along the S axis. Harris et al. show that by stacking a number of such layers each in a different orientation, one can arrange that the resulting cascade of output pulses build up e.g. a sinc-like envelope along each axis. In the frequency domain, such envelopes correspond to quasi-squarewave outputs across the different color bands. In this way one can achieve the cumulative effect of a 90° polarization rotation for a certain set of wavelengths or colors, and no rotation for another set of wavelengths or colors. FIGS. 6a and 6b show an example of such a retarder stack, which rotates incident horizontally polarized green and red lights by substantially 90°, while leaving a blue light unrotated. Specifically, FIG. 6a illustrates a sequence of retarder films that are adapted to constitute a wavelength-selective retarder. FIG. 6b illustrates intensity output from the retarder stack of FIG. 6a, when followed by a horizontal analyzing polarizer. Input is horizontally polarized. From the graph, one can see polarization remains substantially unchanged for blue wavelengths while polarization is rotated 90 degrees for green and red wavelengths.

In general, such retarder stacks are not equivalent (even within a particular wavelength band) to more conventional polarization retarders; for example, though a stack may rotate linear polarized light of a certain color by 90°, it will not generally be equivalent in that color to e.g. a 45°-oriented halfwave plate, which means that the rotation angle cannot be adjusted by reorienting the stack. A different design is required when the desired rotation angle is changed.

In practice, dichroic retarders such as the ones 200 and 500 shown in FIG. 5 are imperfect in their polarization control, as is the polarizing coating 700. However, in the arrangement of FIG. 5, the imperfect retarders and the imperfect PBS are made to work in series, providing acceptable overall performance. Imperfections arising from limitations of each, such as from compound angle effects, are only second order in these imperfections.

This can be understood by calculating the stray light contributions step-by-step through the optical system. For example, if color bands K1 and K2 are both S polarized in the illumination light 100, we can write the output from the retarder 200 as $$I_{Illum} = (I_1)_S + (I_2)_P + \epsilon_1 (I_1)_P + \epsilon_2 (I_2)_S. \qquad [1]$$

Here $\epsilon$ denotes the imperfect polarization control provided by practical retarders of the type 200 ($\epsilon$ has subscript 1 for the color band K1, and subscript 2 for the color band K2). I1 and I2 denote the illuminating intensities in color bands K1 and K2; these have been placed in parentheses to indicate that their polarization is dark state because illumination for reflective LVs is nominally in the dark state. Image components that reflect from bright-switched pixels will be denoted with square brackets.

After the beam represented by the above eq.1, hereafter referred to as the eq.1 beam, reflects from the coating 700, the light valve 220 illuminated through the face 310 sees an intensity $$I_{Illum,S-LV} \cong (I_1)_S + \epsilon_2 (I_2)_S + \delta_{2,R} (I_2)_P. \qquad [2]$$

Here $\delta_{2,R}$ represents PBS leakage in reflection for the color K2. High order terms in $\epsilon$ and $\delta$ beyond first order are neglected.

Bright pixels in the light valve 220 will rotate the polarization by 90°, while dark switched pixels will leave it unchanged. Using square brackets to denote the output of bright state pixels, we have $$I_{Reflect,S-LV} \cong (I_1)_S + \epsilon_2(I_2)_S + \delta_{2,R}(I_2)_P + [I_1]_P + \epsilon_2[I_2]_P + \delta_{2,R}[I_2]_S. \quad [3]$$

Turning now to the component of the eq.1 beam which transmits through the coating 700 to the LV 230 at the face 410, it is reasonable in a first order calculation to treat the PBS as an essentially ideal polarizer when operating in transmission. The light reflected from the light valve 230 will, after returning to the PBS through the face 410, then take the form $$I_{Reflect,P-LV} \cong (I_2)_P + \epsilon_1(I_1)_P + [I_2]_S + \epsilon_1[I_1]_S. \quad [4]$$

After the beams that have reflected from LV's 220 and 230 are recombined by coating 700, the total beam exiting the PBS through face 510 becomes $$I_{PBS\ Output} \cong [I_1]_P + [I_2]_S + \epsilon_1[I_1]_S + \epsilon_2[I_2]_P + 2\delta_{2,R}(I_2)_P. \quad [5]$$

The wavelength-selective retarder device 500 rotates the K2-color light in polarization by 90 degrees while leaving the K1-color light nominally unrotated. Denoting the mispolarization coefficient for this second retarder by $\epsilon'$, the intensity incident on the cleanup polarizer 600 is then $$I_{Retarder\ Output} \cong [I_1]_P + [I_2]_P + \epsilon_1[I_1]_S + \epsilon_2[I_2]_S + 2\delta_{2,R}(I_2)_S + \epsilon'_1[I_1]_S + \epsilon'_2[I_2]_S. \quad [6]$$

Finally the polarizer 600 passes only lights with P polarization. The image light transferred to a projection lens (not shown in FIG. 5) is then $$I_{Screen} \cong [I_1]_P + [I_2]_P. \quad [7]$$

Unwanted dark-state lights are successfully eliminated from the image light.

Eq.7 shows that the wavelength-selective filtering device of FIG. 5 removes all first-order background contributions of the kind which ordinarily arise from imperfect polarization control in optical components. As will now be discussed, alternative embodiments of the present invention can achieve the same contrast correction using wavelength-selective optical devices that are different from the retarders of the embodiment of FIG. 5. Moreover, changes can be made in the embodiment of FIG. 5 to better reduce black-state contributions of higher order.

To investigate these tradeoffs, it is reasonable to employ an analytical scheme which takes into account the strongly differing levels of imperfection that typically arise in optical components of different kinds. For example, with realistic components it is reasonable to consider the mispolarized intensity from a PBS operating in reflection, and the mispolarized intensity from a wavelength-selective retarder, to both be first order quantities [e.g. of order a few percent], but to consider the mispolarized intensity from the PBS in transmission to be a second order quantity [e.g. a fraction of a percent]. This is because many PBSs achieve a far better extinction in transmission than in reflection. We will also assume that dark-state LV performance is sufficiently high to reduce mispolarization of the reflected beam to a second order quantity, in the case where the incident light is within the spectral band for which the LV was designed. On the other hand, with some LV technologies the mispolarization may be larger when the incident light is outside the design wavelength band. In the present examples, we will consider LV mispolarization to be a first order quantity for out-of-band light. It will be clear from the following discussion how the design tradeoffs that are made in preferred embodiments below can be altered if the polarization control in the various components changes appreciably from these assumptions.

In certain embodiments of the present invention, wavelength-selective linear polarizers may be used as a wavelength-selective filtering device to supplement or replace the wavelength-selective retarder 500 in the embodiment of FIG. 5. Within a certain wavelength band, such wavelength-selective linear polarizers absorb one polarization while passing the other; outside this wavelength band both polarizations are passed. Such polarizers are sold for example by Nitto-Denko Corp. as types NPF-Q-10R, NPF-Q-10G, and NPF-Q-10B, and are also described by S. Mohri and T. Matsuo in "Highly Durable Dyed Polarizer for Use in LCD Projection," *SPIE* v.2407, *Projection Displays*, p.62, (1995). See FIGS. 5 and 6.

The optical density of wavelength-selective linear polarizers of the above kind is ideally low enough to avoid severe loss in the passband, but these polarizers are then not likely to provide as high extinction in the stopband as do more conventional polarizers. We will therefore treat the leakage through wavelength-selective polarizers as a first order quantity.

Based on the above considerations, we will denote the leakage polarization from a PBS in reflection as $\delta_R$ and the leakage in transmission as $\delta_T^2$, with the square exponent representing the weaker imperfection that is typically present in the latter case. Note that leakage is measured here in intensity units, not amplitude units. The spectral dependence of $\delta$ will be denoted using subscripts 1 and 2; for example the leakage of the P polarized light in reflection from the PBS hypotenuse will be denoted $\delta_{1,R}$ if the light is in the color band K1, and as $\delta_{2,R}$ for the light in the color band K2.

Similarly, the leakage from an LV operating in its design spectral band will be denoted $\xi^2$, a second order quantity. More specifically, if the LV is designed to operate in, for example, the color K1, we will denote the dark-state leakage as $\xi_{1,1}^2$ when the incident light is also in the color band K1. On the other hand, if a light outside the design band is incident on the LV, e.g. the light of the color band K2, we will denote the leakage intensity as a first-order quantity $\xi_{1,2}$.

Mispolarized intensity from a wavelength-selective retarder will be denoted $\epsilon_i$, where i=1, 2 denotes the color band K1 or K2, and similarly light leakage from a wavelength-selective linear polarizer will be denoted $\epsilon_i$. It is noted that light leakage from a conventional polarizer will be considered negligible.

When we extend the calculation of eqs.1–7 to include all second order terms, assuming for simplicity that the LVs are entirely in the dark state, we find that the black state intensity for the system of FIG. 5 is to the second order given by $$I_{System} = (I_1)(\xi_{1,1}^2 + 2\epsilon_1\delta_{1,R}) + (I_2)(\xi_{2,2}^2 + 2\epsilon'_2\delta_{2,R}) \quad [8]$$

where $(I_1)$ and $(I_2)$ represent the illuminating intensities in color bands K1 and K2, respectively, and where a prime is used to distinguish the imperfection $\epsilon'$ in the exit retarder 500 from the imperfection E in the input retarder 200. Note that, in contrast to the first order equations 1–7, we have here assumed for simplicity that there are no bright-switched pixels in the light valves.

Eq.8 shows that most stray light paths in FIG. 5 involve contributions of the third order or higher in the various component imperfections. We will illustrate this by considering a particular stray light path in more detail, breaking the path up into three stages:

1) To the lowest order, the effect of the misconversion $\epsilon_2$ of the incident K2 light by the input retarder 200 from P polarization to undesired S polarization is to cause unwanted S polarized light in the K2 color band to illuminate the LV 220 through the face 310. (Leakage of this S polarized light through coating 700 to the LV 230 at the face 410 is only of the second order, and does not contribute to the image except in the third order.)

2) Since this S-polarized K2-color stray light is not within the design spectral band of the LV 220, the LV 220 converts a fraction $\xi_{1,2}$ to P polarization; thus, the overall intensity of this P-polarized stray light becomes a second order quantity $\epsilon_2 \xi_{1,2}$. (Leakage through the coating 700 of the portion that remains in S polarization is only of the second order, and does not contribute to the image except in the third order.)

3) When the P-polarized stray light is reincident on the coating 700, it is transmitted almost in toto to the retarder 500. However, since this light is in the color band K2, the retarder 500 converts nearly all of it to S polarization which is blocked by the polarizer 600. Only a third order fraction $\epsilon_2 \xi_{1,2} \epsilon'_2$ therefore remains in P polarization state and so leaks through to the image light.

The above example illustrates that most stray light paths in the configuration of FIG. 5 involve contributions of the third order or higher. Eq.8 shows that except for the direct leakage contributions $\xi^2$ from the LVs themselves, the only second order paths in the system of FIG. 5 involve joint imperfections in the retarders and the PBS operating in reflection. For each retarder, stray light paths arise along both the LV 220 at the exit face 310, and the LV 230 at the exit face 410, as indicated by the factors of two that appear in eq.8.

Consider for example the factor of two in the term $2(I_2)\epsilon'_2 \delta_{2,R}$ which is associated with retarder 500, hence the prime mark, and with the PBS 202 operating in reflection, and which involves K2 wavelengths. Though a major portion of the nominally P polarized light of the color K2 which is output from the retarder 200 will be transmitted by the coating 700 to the LV 230 at the exit face 410, a small fraction will instead be reflected by the coating 700 onto the LV 220 at the face 310 which is nominally dedicated to the color band K1. To the lowest order, this light will remain in P polarization state after reflection from the dark state LV 220, and so will be passed by the coating 700 to the retarder 500. In addition, the P-polarized K2-color light arrives at the retarder 500 along a second path which involves the LV 230. The major portion of the P-polarized K2-color light from the input retarder 200 illuminates the LV 230 at the exit face 410. A small portion of the light returned by LV 230 (in P polarization state) will then be misreflected by the coating 700 to the retarder 500, instead of being transmitted to the light source 90. In the lowest order, the P-polarized K2-color light following these two stray light paths (i.e. from the LVs 220 and 230) is converted by the retarder 500 to S polarization state. However, a small fraction (of second order in overall amplitude) is not properly converted by the retarder 500, and so remains in P polarization state. This then is passed by the polarizer 600 onto the screen. The resultant background image intensity from the two stray light paths is represented in eq.8 by the second order term $2I_2\epsilon'_2\delta_{2,R}$. In a similar way, imperfections in the retarder 200 give rise to two additional stray light paths, as indicated by the term $2I_1\epsilon_1\delta_{1,R}$.

Figure 7:
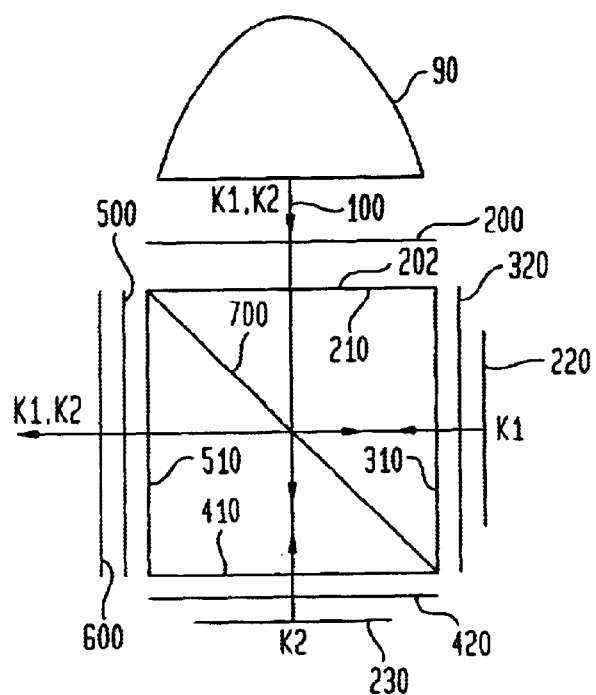
FIG. 7 illustrates a variation to the projection display system of FIG. 5 wherein color filters are positioned between the PBS and light valves.

Referring to FIG. 7, there is illustrated a variation of the embodiment of FIG. 5, in which color filters 320 and 420 are positioned at exit faces 310 and 410 of the PBS 202. In FIG. 7 and the following figures, all components similar to or identical with those in FIG. 5 are designated with the same reference numbers.

In the projection display system of FIG. 7, color filters 320 and 420 are preferably of the type that absorb certain wavelengths while passing others (as are manufactured by Schott, Hoya, and Corning). Filter 320 passes the K1-color light while absorbing the K2-color stray light, while filter 420 passes the K2 color bands and absorbs K1. Background intensity in the FIG. 7 system is given by $$I_{System}=(I_1)(\xi_{1,1}^2+\epsilon_1\delta_{1,R})+(I_2)(\xi_{2,2}^2+\epsilon'_2\delta_{2,R}) \qquad [9]$$

The color filters 320 and 420 thus cut in half the stray lights associated with wavelength-selective retarders 200 and 500.

Figure 8:
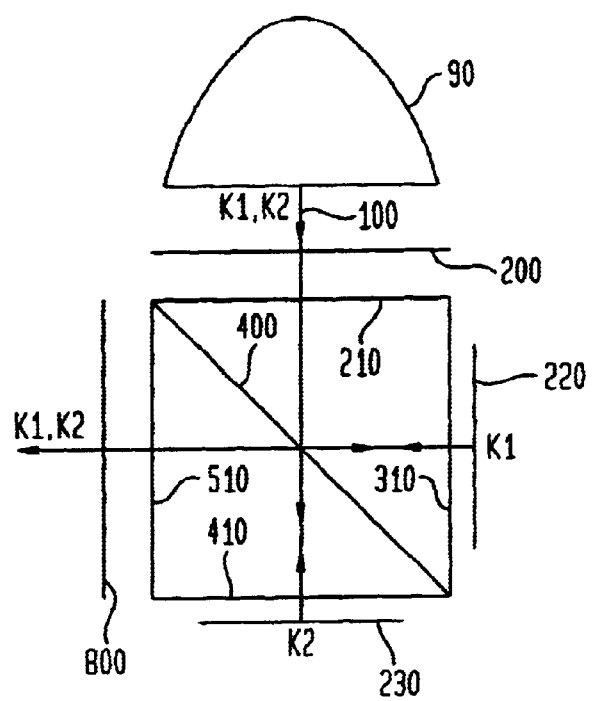
FIG. 8 illustrates another embodiment of a projection display system according to the present invention.

Further variations are possible which, like those of FIGS. 5 and 7, have the desirable attribute of reducing all stray light paths to at most a second order intensity. For example, FIG. 8 shows another embodiment of the present invention in which a wavelength-selective polarizer 800 replaces a combination of the dichroic retarder 500 with its complex multilayered structure as shown in FIG. 6a and the linear polarizer 600 of FIG. 5. The wavelength-selective polarizer 800 is adapted to substantially pass both polarizations in the K1 color band and S polarized light in the K2 color band, but to block a major portion of the P-polarized K2-color light. Background intensity in the embodiment of FIG. 8 is given by $$I_{System}=(I_1)(\xi_{1,1}^2+2\epsilon_1\delta_{1,R}+2\delta_{1,T}^2+\epsilon_1\xi_{2,1})+(I_2)(\xi_{2,2}^2+2e_2\delta_{2,R}). \qquad [10]$$

The embodiment of FIG. 8 thus suppresses all first order stray light paths using a simpler set of polarizing filters than the embodiment of FIG. 5, though it does not suppress second order stray light paths as successfully.

Figure 9:
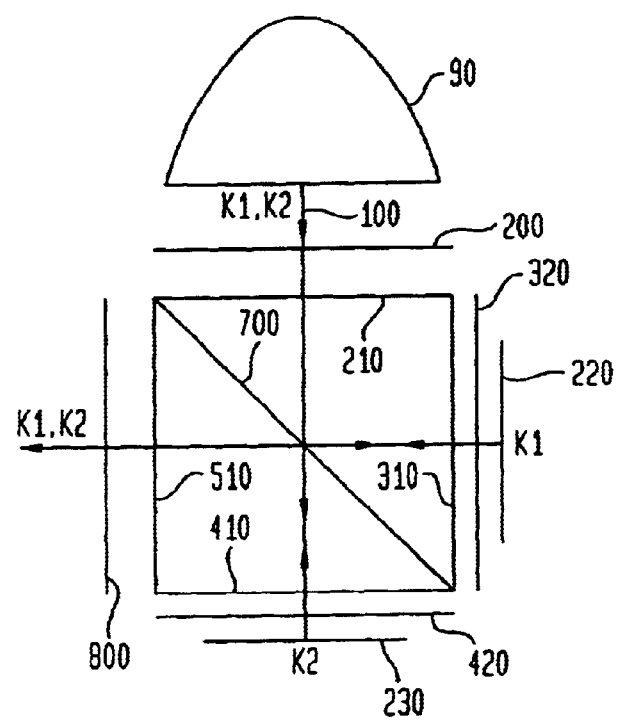
FIG. 9 illustrates a variation to the projection display system of FIG. 8 wherein color filters are positioned between the PBS and light valves.

FIG. 9 shows another embodiment in which color filters 320 and 420 are added to the arrangement of FIG. 8, reducing dark-state intensity to $$I_{System}=(I_1)(\xi_{1,1}^2+\epsilon_1\delta_{1,R}+\delta_{1,T}^2)+(I_2)(\xi_{2,2}^2+2e_2\delta_{2,R}). \qquad [11]$$

Figure 10:
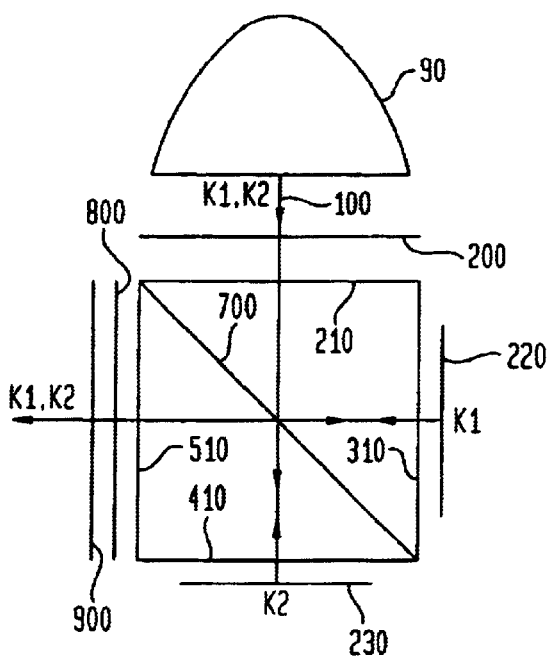
FIG. 10 illustrates a variation to the projection display system of FIG. 8 wherein additional wavelength-selective polarizer is provided.

FIG. 10 shows a variation of the system of FIG. 8, in which at the output face 510 a second wavelength-selective polarizer 900 is positioned in front of the first wavelength-selective polarizer 800 used as in the system of FIG. 8. The polarizer 900 blocks S-polarized K1 wavelengths while passing other colors and polarizations. Dark-state intensity is given by $$I_{System}=(I_1)(\xi_{1,1}^2+2e_1\delta_{1,R})+(I_2)(\xi_{2,2}^2+2e_2\delta_{2,R}). \qquad [12]$$

Figure 11:
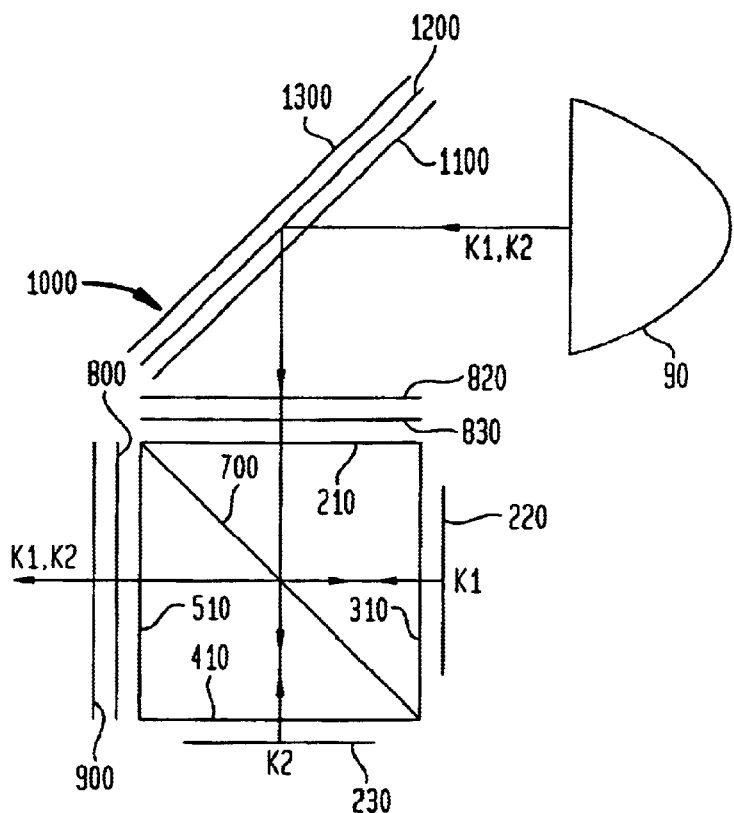
FIG. 11 illustrates a variation to the projection display system of FIG. 10 wherein a tilted mirror stack is used as a wavelength-selective retarder device.

FIG. 11 shows a variation of the system of FIG. 10 in which the wavelength-selective retarder 200 of the system of FIG. 10 is replaced by another wavelength-selective retarder device or a tilted mirror stack 1000 that comprises a tilted dichroic mirror 1100, a tilted quarterwave retarder 1200 stacked over the tilted mirror 1100, and a tilted mirror 1300 stacked over the tilted quarterwave retarder 1200. Note that the separation of these elements is exaggerated in FIG. 11 for clarity. The tilted quarterwave retarder 1200 may be a retarder tuned for quarterwave phase difference at 45° (single-pass) in the color band passed by the dichroic mirror 1100, or it may be a stack of retarders which function as a polarization rotator (halfwave or otherwise) in double-pass. Wavelength-selective polarizers 820 and 830 correct imperfections in the stack 1000, and also reduce compound angle depolarization. Specifically, the polarizer 820 blocks P-polarized light at K1 wavelengths while passing other lights having a different polarization or a different wavelength. The polarizer 830 then blocks S-polarized light at K2 wavelengths while passing other lights having a different polarization or a different wavelength.

Figure 12:
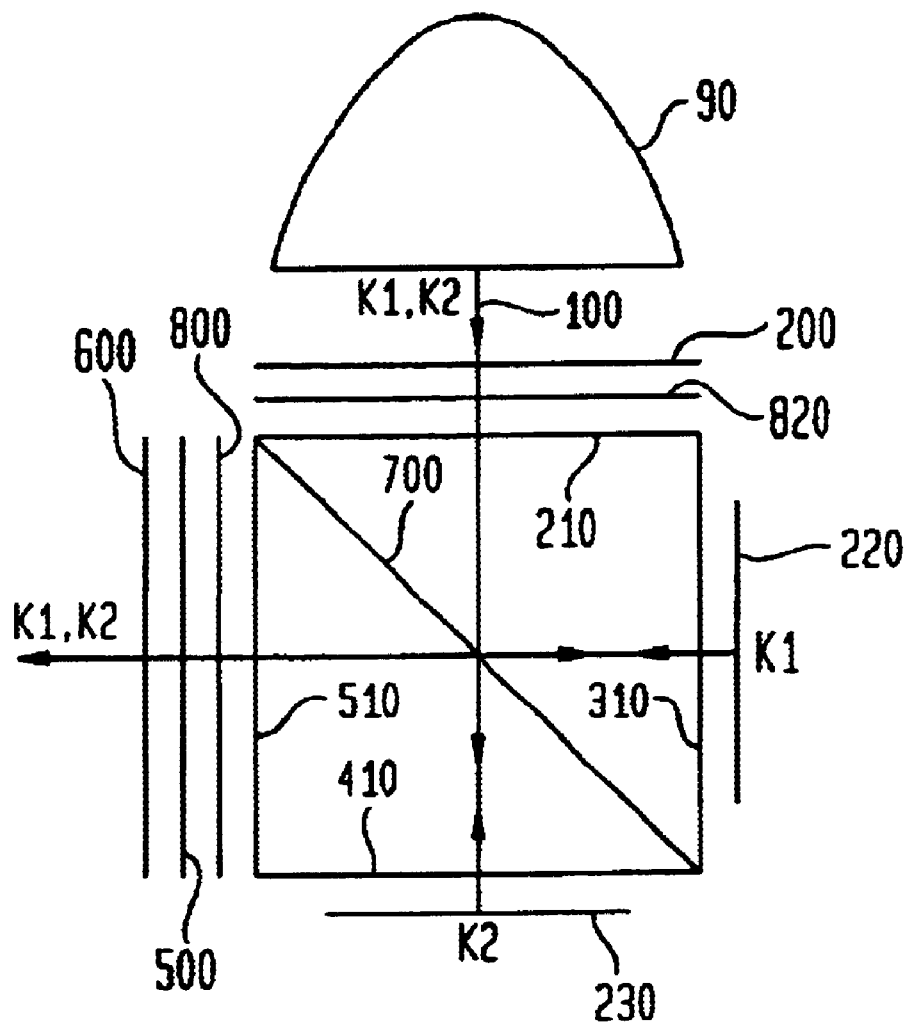
FIG. 12 illustrates a further embodiment of a projection display system according to the present invention.

FIG. 12 shows a further embodiment of the present invention which essentially combines the features of the embodiments of FIGS. 5 and 10. The wavelength-selective retarder 200 in the system of FIG. 5 is supplemented by the wavelength-selective polarizer 820, which blocks P-polarized K1-color light while passing other lights having a different polarization or a different wavelength. Similarly, the wavelength-selective retarder 500 and the linear polarizer 600 of the system of FIG. 5 are supplemented by the wavelength-selective polarizer 800, which blocks P-polarized K2-color light. Dark-state intensity in the system of FIG. 12 is given by $$I_{System} = (I_1)(\xi_{1,1}^2) + (I_2)\xi_{2,2}^2 \quad [13]$$

Eq.13 shows that the embodiment of FIG. 12 eliminates all first and second order stray light contributions, except those arising from the light valves themselves. Residual dark-state intensity contributed by imperfect polarizaton control in optical components has been reduced to terms that are third order or higher.

When the wavelength-selective retarder and the PBS of the present invention are used in a time sequential mode, it is not necessary that the K1 and K2 color assignments to the two lightvalve channels (PBS faces 310 and 410) be fixed. The '340 patent and U.S. Pat. No. 5,921,650 issued on Jul. 13, 1999 to Doany et al. and hereby incorporated by reference, have disclosed time sequential projection displays in which the polarization of any illuminating color (whether R, G, or B) is S during certain cycles and P during others. This has the advantage of easing the switching-time requirements of the light valves because, with two light valves available to project R, G, B subframes, the subframes need only be displayed at 1.5 times the tricolor frame rate. Moreover, the time sequential mode increases the brightness of the projection display because two colors can in principle be displayed at all times and therefore only one color need be discarded.

Figures 13A, 13B:
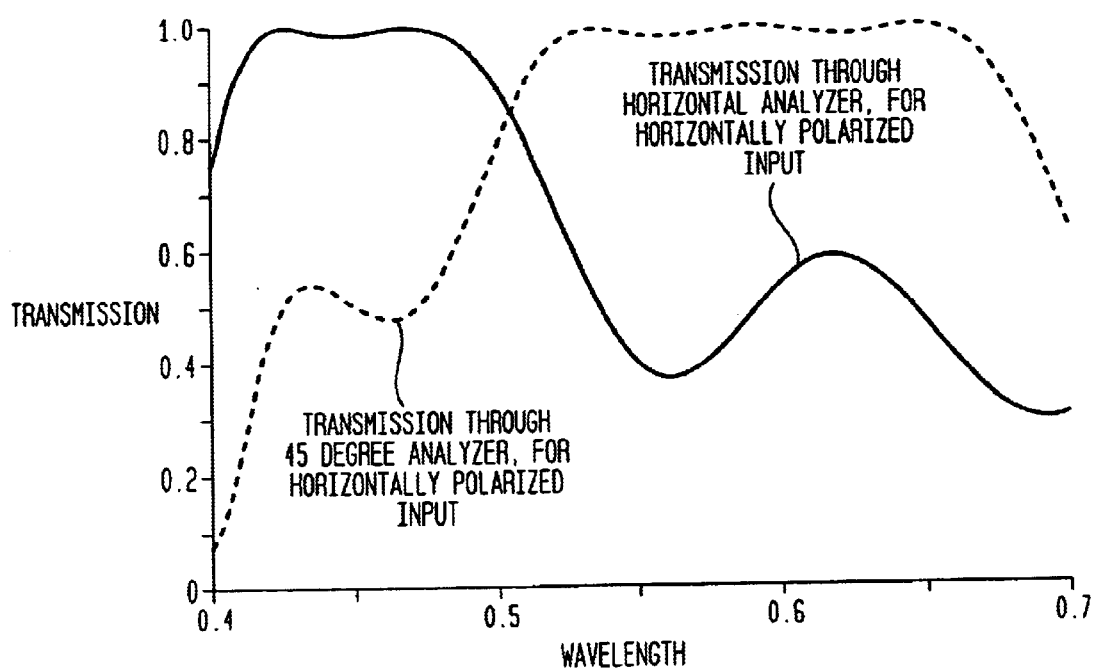
FIG. 13a shows a sequence of retarder films that are used for a switchable wavelength-selective retarder device that provides switchable control of a blue light.
FIG. 13b shows intensity output from the retarder stack of FIG. 13a when followed by an analyzing polarizer that is horizontal or oriented at 45 degrees.

The wavelength-selective retarder and the PBS of the present invention can accommodate time sequential modes of this kind by using wavelength-selective retarder stacks that are switchable, which may be constructed per the embodiment now described:

First, FIG. 13*a* shows a design for a substack component of such a retarder. The substack of FIG. 13*a* rotates the polarization of horizontally polarized green and red lights by about 45°, while leaving blue light substantially horizontally polarized. FIG. 13*b* shows intensity output from the retarder substack of FIG. 13*a*, when followed by an analyzing polarizer that is horizontal or oriented at 45 degrees. Input light is horizontally polarized. It is seen from FIG. 13*b* that polarization remains substantially horizontal for blue wavelengths while polarization is approximately rotated 45 degrees for green and red wavelengths. Note that this system cannot be obtained simply by rotating the stack of FIG. 6*a* to a new angle, as would be possible if these retarder stacks were simply equivalent to halfwave retarders.

A switchable blue-selective retarder can be constructed from the substack of retarder films of FIG. 13*a* by following it with a conventional switchable halfwave retarder (such as a pi-cell) whose fast (F) and slow (S) axes are oriented at 45° and 135°. These two components, that is, the substack of retarder films and the switchable halfwave retarder, are then followed by another component that is the substack of retarder films of FIG. 13*a* with the sequence of retarder films in the reverse order. If horizontally polarized light is input to the switchable retarder comprising the above-mentioned three components, the light that exits the initial substack of retarder films is polarized at 45° in green and red wavelengths, but remains horizontally polarized in blue. Red and green wavelengths are then either polarized along or perpendicular to the F and S axes of the switchable halfwave retarder. The halfwave retarder has therefore no effect on red or green. Blue wavelengths, however, are rotated 90° if the halfwave retarder is switched on, and are left unrotated if the halfwave retarder is switched off. The final substack of retarder films reverse the initial 45° rotation of the red and green wavelengths, while leaving the blue wavelengths in whatever state it has been set to by the switchable halfwave retarder. The retarder stack of FIG. 13*a*, a switchable rotator, and the stack of FIG. 13*a* in reverse order, thus form a retarder group which allows blue light to be switched in polarization between two perpendicular states (while leaving unchanged the polarization of red and green light input in either of these two states).

Figures 14A, 14B:
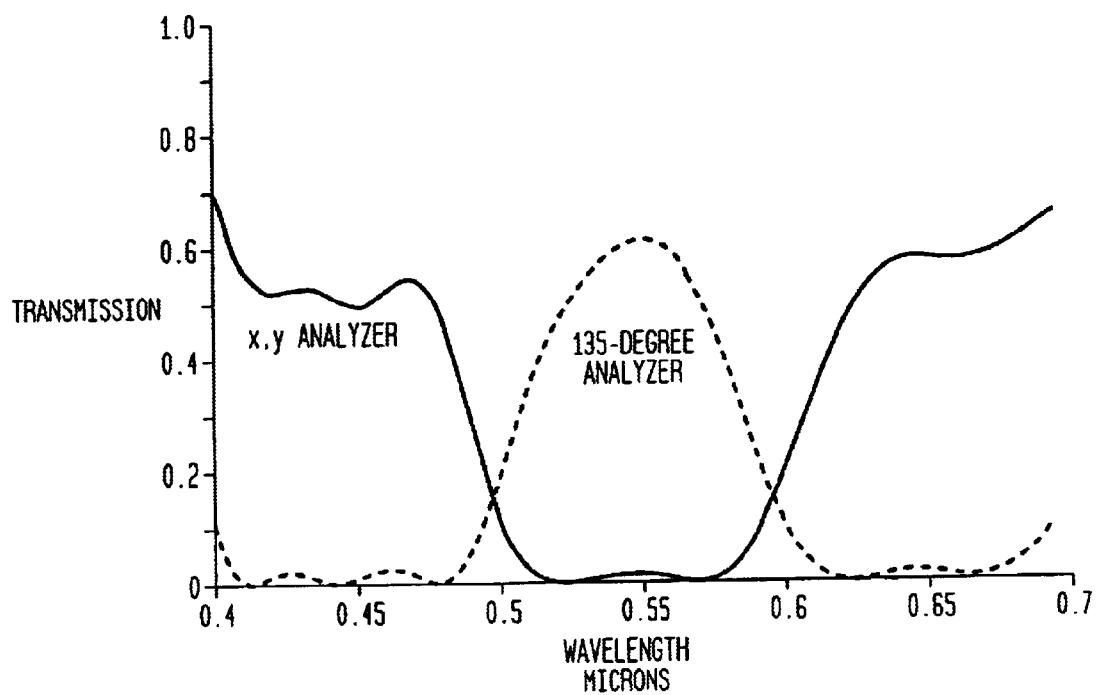
FIG. 14a shows a sequence of retarder films that are used for a switchable wavelength-selective retarder device that provides switchable control of a green light.
FIG. 14b shows intensity output from the retarder stack of FIG. 14a when followed by an analyzing polarizer that is horizontal or oriented at 135 degrees.
Figures 15A, 15B:
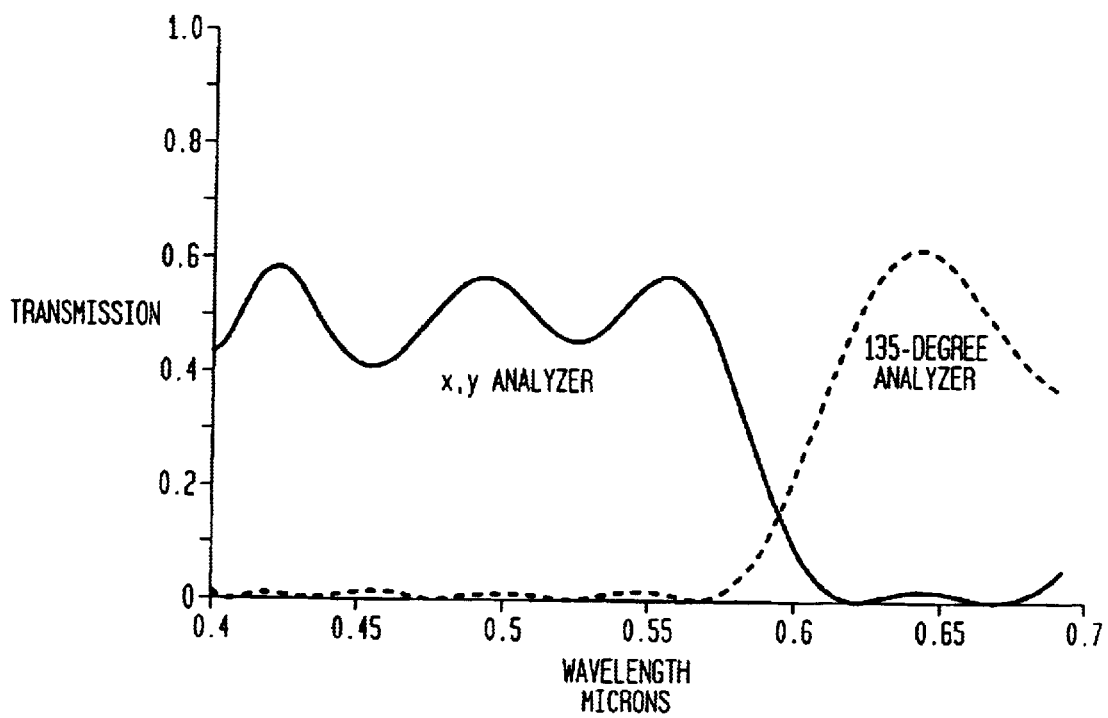
FIG. 15a shows a sequence of retarder films that are used for a switchable wavelength-selective retarder device that provides switchable control of a red light.
FIG. 15b shows intensity output from the retarder stack of FIG. 15a when followed by an analyzing polarizer that is horizontal or oriented at 135 degrees.

Groups to provide switchable control of red and green wavelengths can be constructed in the same way. FIGS. 14*a* and 15*a* show passive retarder stacks for green and red wavelengths that are analogous to the retarder stack of FIG. 13*a* for the blue wavelengths. The sequence of retarder films of FIG. 14*a* rotates the polarization of red and blue wavelengths by 45° while leaving the green wavelengths unchanged. Similarly the stack given in FIG. 15*a* rotates blue and green wavelengths while leaving the red wavelengths unchanged. The common feature of the passive stacks in FIGS. 13*a*, 14*a* and 15*a* is that they leave the polarization in one color unchanged (so long as it is incident in one of two orthogonal polarization states), while rotating the polarization of other colors by 45°. The color that is not rotated can then be switched in polarization by a pi-cell whose axes are oriented at 45° and 135°; the polarization of the colors that have been rotated to 45° will not be affected. (The same function can be achieved if the retarder stack is designed to rotate the color to be switched by 90° while rotating the other colors by 45° or 135°.) The layers in the passive stack are then repeated in reverse order; the reversed layers bring the non-switched colors back to their original orientation while leaving the polarization of the remaining color in whatever orientation it has been switched to by the pi-cell. The resultant group of switchable halfwave and passive retarders thus provides switchable control over the polarization in one color band while leaving the polarization of other colors unchanged.

Figure 16:
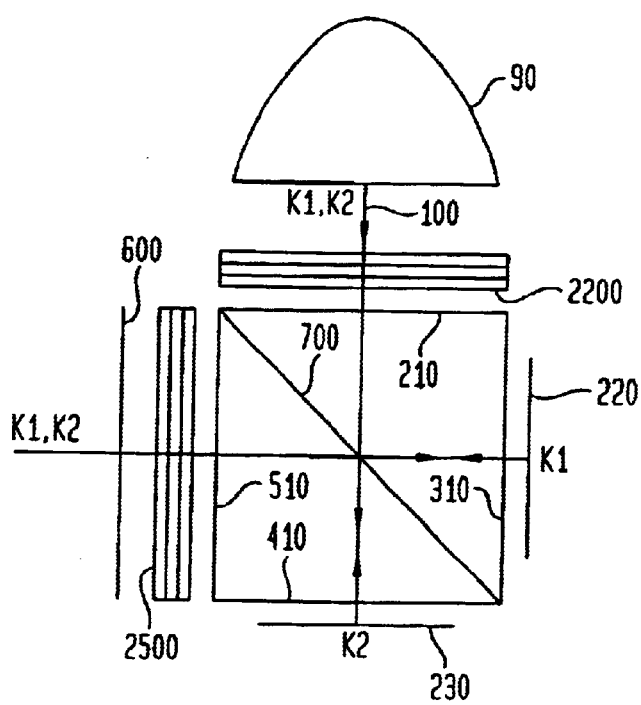
FIG. 16 illustrates a further embodiment of a projection display system according to the present invention wherein assignment of two sets of wavelengths to two light valves is switched sequentially in time.

Three such groups in series can thus provide independent control of the polarization of red, green, and blue wavelengths, forming an R, G, B switchable retarder. Two switchable retarders of this kind are shown as elements 2200 and 2500 in FIG. 16. The system of FIG. 16 functions in the same way as the system of FIG. 5, except that in FIG. 16 the color assignments for the K1 and K2 color bands can be changed sequentially in time. As these assignments are changed, elements 2200 and 2500 are switched to provide the same instantaneous function as the retarder stacks 200 and 500 in the embodiment of FIG. 5.

It should be noted that color dichroics or other combining coatings can be used to combine into a single projected image the images that are output from multiple subsystems. These subsystems comprise light valves, beamsplitters, and wavelength-selective retarder devices which according to the present invention allow light valves to be used in two beamsplitter channels. Similarly, color dichroics or other combining coatings can be used to combine into a single projected image light both the image light that is output from a beamsplitter that incorporates wavelength-selective retarder devices and light valves according to the present invention, and the image light output from a conventional beamsplitter and light valve.

Figure 17:
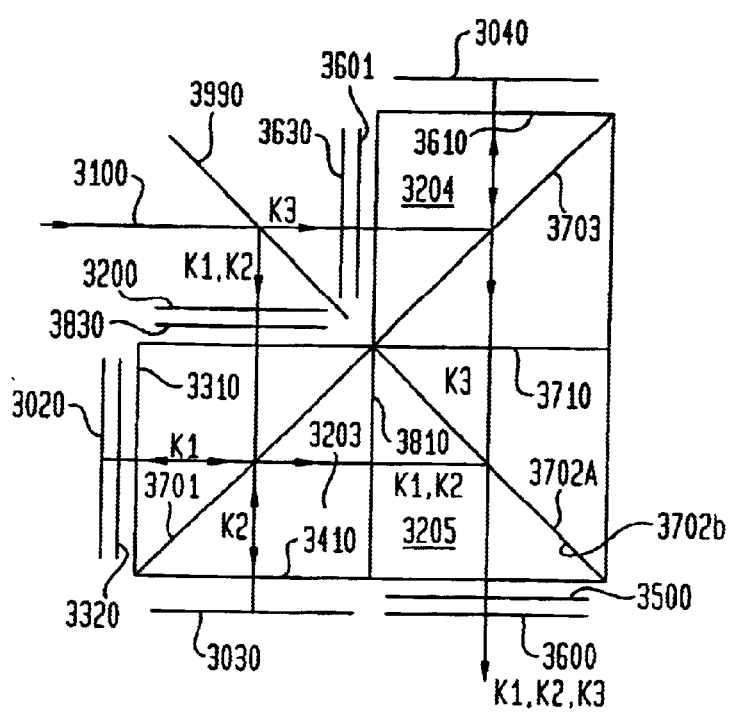
FIG. 17 illustrates another embodiment of a projection display system according to the present invention wherein three reflective light valves are used.

FIG. 17 shows a three light valve embodiment incorporating multiple beamsplitters in this way. An incident S polarized beam 3100 is divided by a dichroic mirror 3990 into a beam containing colors K1 and K2 (these might for example be red and blue) and a K3 colored beam (e.g. green). The K1 and K2 beam is transmitted through a wavelength-selective retarder 3200, which converts K2-colored beam substantially to P polarization, while leaving K1-colored beam substantially S polarized. A wavelength-selective polarizer 3830 then substantially reduces residual P polarization from the K1-colored beam, while passing both polarizations of the K2 beam (mainly P is present) and the S polarization of the K1 beam. High efficiency is possible from the polarizer 3830 if red and blue wavelength bands are chosen for K1 and K2, since the bands are then well-separated spectrally, allowing a gradual transition (over green wavelengths) between the P absorption band in K1 and the high transmission region of K2.

The K1 and K2 beam is separated by polarizing coating 3701 at a hypotenuse of a PBS 3203 into a K1 beam and a K2 beam. A light valve 3020 is thus illuminated by a light nominally of K1 color; however, a small portion of the K2 colored light will also exit a face 3310 of a PBS 3202, due to imperfections in components 3200, 3830 and 3701, and because of compound angle depolarization between the non-parallel surfaces 3990 and 3701. An absorptive color filter 3320 is therefore included between the PBS 3203 and the light valve 3020 to remove this misdirected K2 light.

Similarly, some K1 light will leak into the K2 beam that illuminates a light valve 3030. This leakage will only contribute to the image in terms of third order or higher (because the coating 3701 operates in transmission for the K2 illumination); nonetheless, the magnitude of the compound angle contribution increases quadratically as the cone angle of the light beam is increased. If excessive, the misdirected K1 light can be substantially reduced with a second wavelength-selective linear polarizer placed between the PBS 3203 and the wavelength-selective polarizer 3830; alternatively, it can be substantially reduced by a color filter placed between the PBS 3203 and the light valve 3030.

Though such elements are not shown in FIG. 17 for the K2 channel, a cleanup color filter and a cleanup polarizer are shown in the K3 channel as 3630 and 3601 respectively. The K3 beam illuminates a light valve 3040 via a polarizing coating 3703 on the hypotenuse of a PBS 3204. The PBS 3204 operates in essentially the conventional way if considered in isolation, i.e. it uses only one channel for light valves (through a face 3610). However, the PBS for K1,K2 colors (PBS 3203) operates according to the present invention with two light valve channels (through faces 3310 and 3410), via the wavelength-selective polarizing elements 3200 and 3830. Similarly, wavelength-selective retarder 3500 allows light valve beams to be combined through two channels of a recombining PBS 3205 (through faces 3710 and 3810). PBS 3205 is formed from cemented substrates 3702a and 3702b. The substrate 3702a is coated along the hypotenuse to reflect P polarized light in color band K1, and to transmit P polarized light in color bands K2 and K3. The substrate 3702b is coated along the hypotenuse to transmit P polarization in all colors, and to reflect S polarized light in bands K2 and K3. (Alternatively, if a wavelength-selective rotator and/or polarizer is placed between the PBS 3203 and a PBS 3205, the coatings along 3702a and 3702b can be designed to reflect S polarization and transmit P polarization in all colors.)

Upon exiting the PBS 3205, the bright-state image light is P polarized in the K1 and K3 bands, while in K2 it is S polarized; however, the wavelength-selective retarder 3500 rotates the polarization of K2 relative to the K1 and K3 bands to provide common bright and dark states. A residual dark-state light is then substantially reduced by a linear polarizer 3600.

Figure 18:
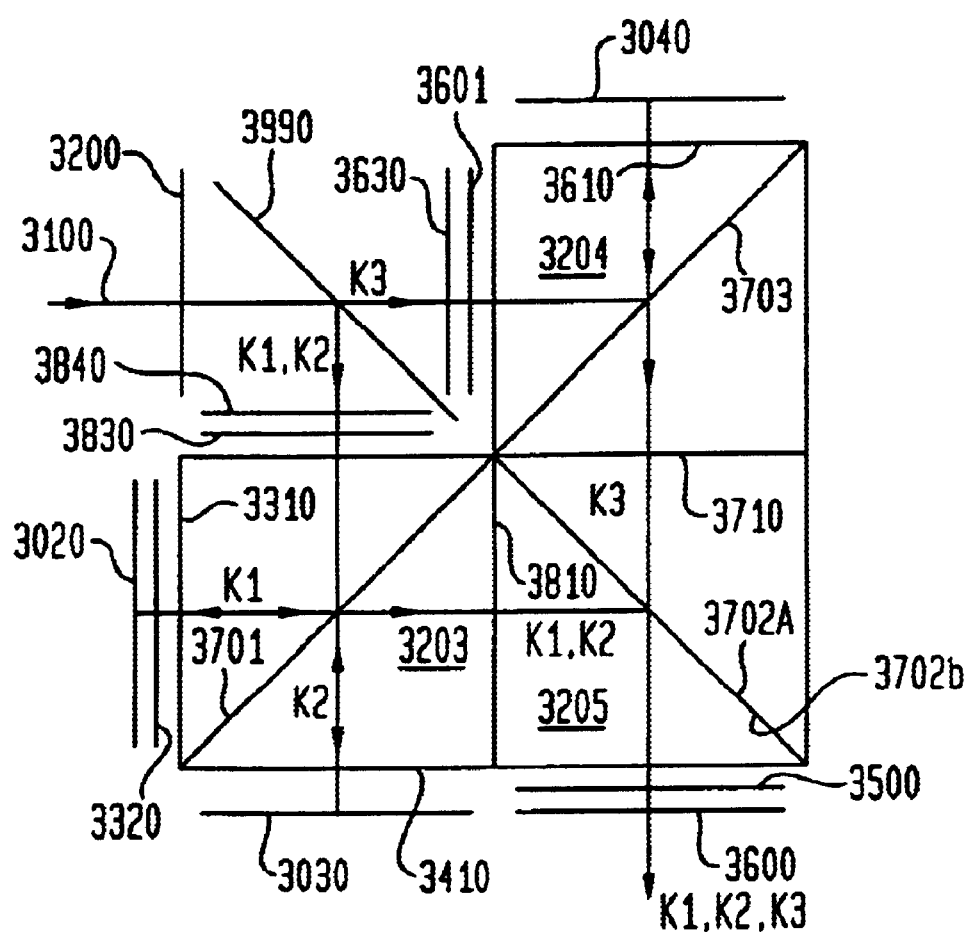
FIG. 18 illustrates a variation to the projection display system of FIG. 17 wherein the wavelength-selective retarder is positioned before the dichroic mirror.

FIG. 18 illustrates a variation to the projection display system of FIG. 17. In this embodiment, the wavelength-selective retarder 3200 is positioned before the dichroic mirror 3990. An element 3840 added to the system of FIG. 17 is a wavelength selective polarizer that reduces S polarized light at K2 wavelengths while passing other colors and polarizations. In FIG. 18, S polarized K1, K2 and K3 beams go through the wavelength-selective retarder 3200 which converts the polarization to P at the K2 color band while leave K1 and K3 bands unchanged. P polarized bright-state lights are produced from S polarized dark-state lights by the light valve 3020 for the K1 color band and by the light valve 3040 for the K3 color band.

While several embodiments and variations of the present invention for a high contrast projection display system with at least two light valves are described in detail herein, it should be apparent that the disclosure and teachings of the present invention will suggest many alternative designs to those skilled in the art.

Figure 1:
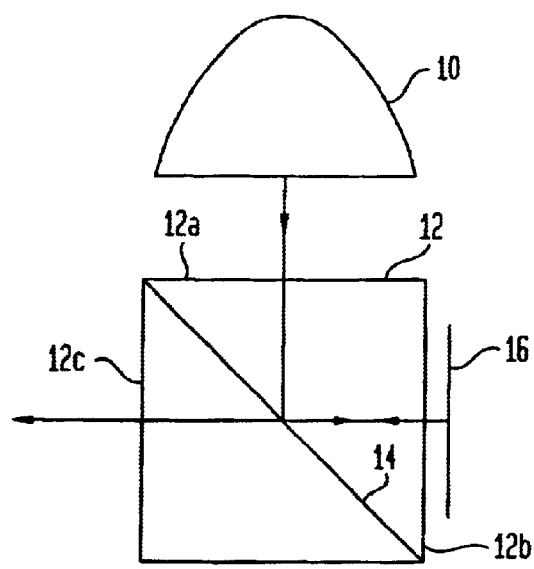
FIG. 1 illustrates a schematic of a conventional projection display system.
Figure 2:
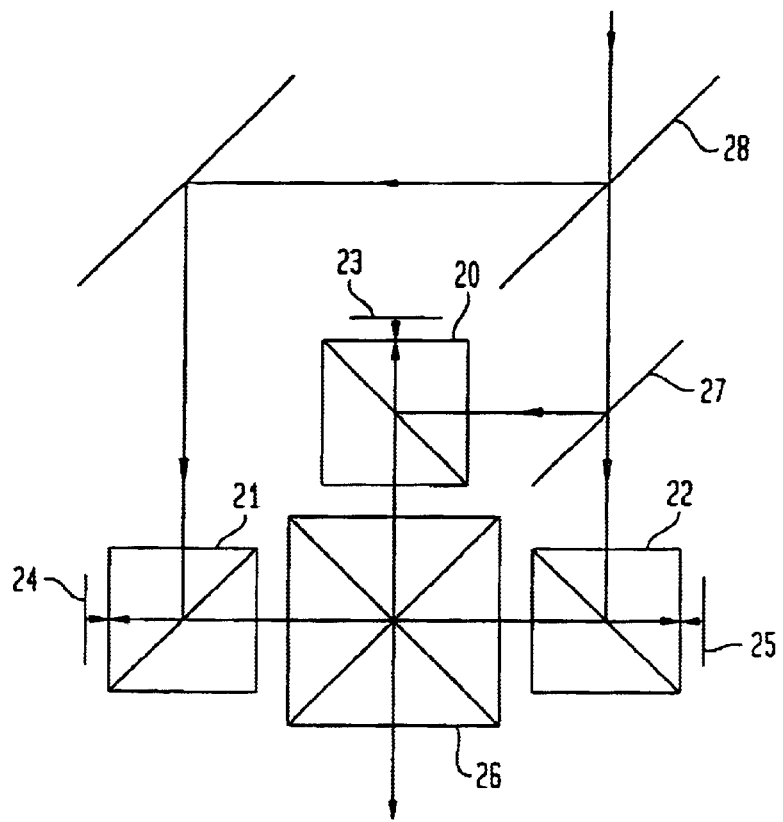
FIG. 2 illustrates another schematic of a conventional projection display system using a PBS and three light valves positioned at three faces of the PBS.
Figure 3:
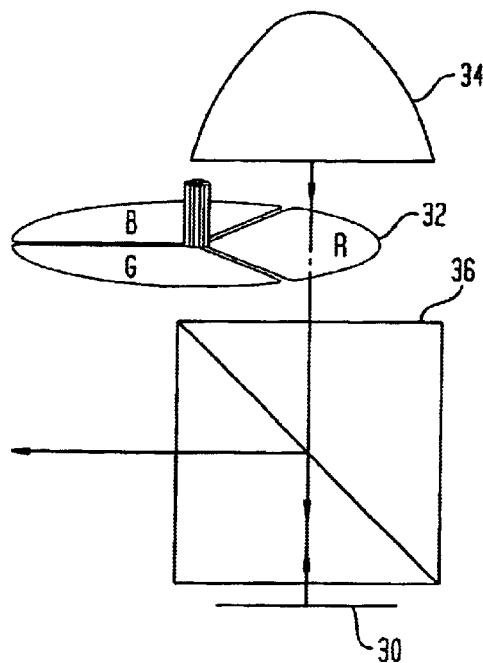
FIG. 3 illustrates another schematic of a conventional projection display system using a light wheel.
Figure 4:
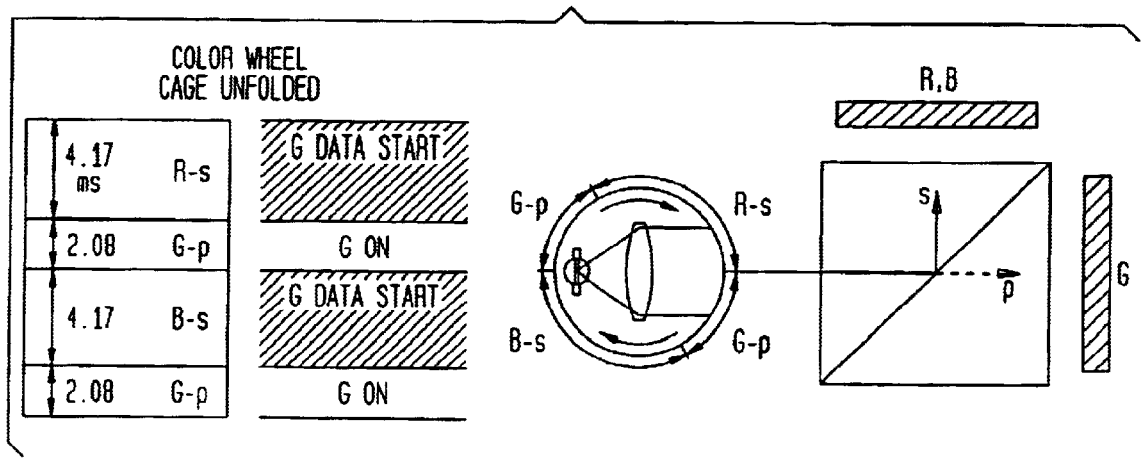
FIG. 4 illustrates another conventional projection display system utilizing a cylindrical (squirrel cage) color wheel.

For example, although the above embodiments have been described in terms of conventional cube or near-cube prism polarizers in which the hypotenuse coating reflects S polarized light and transmits P polarized light, they are readily compatible with other polarizing beam splitters. An example is a frustrated total internal reflection (FTIR) beam splitter disclosed by Li et al. in the reference cited above (P is reflected and S transmitted by this beam splitter); other examples are 3M DBEF or wire-grid polarizers, where the pass axes can have an arbitrary azimuth. While a PBS as shown in FIG. 1 is employed as a light splitting and combining device in the preceding embodiments, another cube based on dichroic recombiners may be used. X-cube is an example of such a cube.

What is claimed is:
1. A projection display system comprising:
   a light source adapted to supply an illumination light having common polarization at first and second sets of wavelengths; a wavelength-selective retarder device positioned to receive said illumination light from said light source and to produce a first dark-state light having a first polarization state at said first set of wavelengths and a second dark-state light having a second polarization state at said second set of wavelengths;
   a first reflective light valve device, comprising one or more light valves, adapted to receive said first dark-state light and to produce a first bright-state light by rotating the polarization from said first polarization state to said second polarization state;
   a second reflective light valve device, comprising one or more light valves, adapted to receive said second dark-state light and to produce a second bright-state light by rotating the polarization from said second polarization state to said first polarization state;

wherein the assignment of said first and second sets of wavelengths to said first and second reflective light valve devices is switched sequentially in time;

a light splitting and combining device positioned between said wavelength-selective retarder device and said first and second reflective light valve devices, said light splitting and combining device adapted to receive said first and second dark-state lights from said wavelength-selective retarder device and to direct said first and second dark-state lights to said first and second reflective light valve devices respectively, and adapted to receive said first and second bright-state lights reflected from said first and second reflective light valve devices respectively and to direct said first and second bright-state lights as a combined beam to a screen; and a wavelength-selective filtering device positioned to receive said combined beam containing said first and second bright-state lights from said light splitting and combining device and to substantially eliminate a residual dark-state light from said first and second light valve devices, wherein the wavelength-selective filtering device passes a beam containing all of red, blue and green primary color components of a color image which is projected onto the screen with improved contrast.

2. The projection display system of claim 1, said wavelength-selective retarder device comprising a wavelength-selective retarder adapted to rotate the polarization of said illumination light at either said first or second sets of wavelengths by 90 degrees.

3. The projection display system of claim 1, said wavelength-selective filtering device comprising:

a wavelength-selective retarder adapted to rotate the polarization of either said first or second bright-state light by 90 degrees so that the said first and second bright-state lights have a common polarization, and a a linear polarizer following said wavelength-selective retarder and adapted to substantially eliminate a light having a polarization orthogonal to the common polarization.

4. The projection display system of claim 1, said wavelength-selective filtering device comprising a first wavelength-selective polarizer adapted to block a light having said second polarization state at said second set of wavelengths while passing other lights having a polarization different from said second polarization or having a wavelength out of said second set of wavelengths.

5. The projection display system of claim 4, said wavelength-selective filtering device further comprising a second wavelength-selective polarizer adapted to a block a light having said first polarization state at said first set of wavelengths while passing other lights having a polarization different from said first polarization or having a wavelength out of said first set of wavelengths.

6. The projection display system of claim 1, wherein said wavelength-selective retarder device comprises a retarder stack adapted to rotate the polarization of said illumination light at either said first or second sets of wavelengths by 90 degrees, said retarder stack being followed by a wavelength-selective polarizer adapted to block a light having said second polarization at said first set of wavelengths, and said wavelength-selective filtering device comprises a wavelength-selective linear polarizer adapted to block a light having said second polarization at said second set of wavelengths, said wavelength-selective polarizer being followed by a combination of a dichroic retarder adapted to rotate the polarization of either said first or second bright-state light by 90 degrees so that said first and second bright-state lights have a common polarization, and a linear polarizer adapted to substantially eliminate a light having a polarization orthogonal to the common polarization.

7. The projection display system of claim 1, further comprising:

a first color filter positioned between said light splitting and combining device and said first reflective light valve device, said first color filter adapted to absorb a light having a wavelength within said second set of wavelengths while passing a light having a wavelength within said first set of wavelengths, and a second color filter positioned between said light splitting and combining device and said second reflective light valve device, said second filter adapted to absorb a light having a wavelength within said first set of wavelengths while passing a light having a wavelength within said second set of wavelengths.

8. The projection display system of claim 1, wherein said light splitting and combining device includes:

a first face adapted to receive said illumination light from said light source;

a second face adapted to output said first and second bright-state lights;

a third face adapted to output said-first dark-state light directed to said first reflective light valve device and to receive said first bright-state light reflected from said first reflective light valve device, and a fourth face adapted to output said second dark-state light directed to said second reflective light valve device and to receive said first bright-state light reflected from said second reflective light valve device.

9. The projection display system of claim 1, wherein said light source further comprises a time-sequential separation device to alternatively supply light in said first and second color bands in said first set of wavelengths to said light splitting and combining device.

10. The projection display system of claim 1, wherein said first and second reflective light valve devices each contain a single-illuminated light valve and comprise all light valves in the projection display system illuminated by said illumination light.

11. The projection display system of claim 1, wherein said wavelength-selective retarder device and said wavelength-selective filtering device are both positioned externally to said light splitting and combining device.

12. The projection display system of claim 1, wherein said light splitting and combining device combines said first and second bright-state lights using a combining element that reflects visible light in said second polarization state that is in said first set of wavelengths, and that reflects visible light in said first polarization state that is not in said first set of wavelengths, and that transmits light in said second polarization state that is not in said first set of wavelengths.

13. The projection display system of claim 1, wherein the projection display system comprises a maximum of one light splitting and combining device.

14. The projection display system of claim 1, wherein the projection display system comprises a maximum of three light splitting and combining devices.

15. A projection display system comprising:

a light source adapted to supply an illumination light having common polarization at first and second sets of wavelengths;

a wavelength-selective retarder device positioned to receive said illumination light from said light source and to produce a first dark-state light having a first polarization state at said first set of wavelengths and a second dark-state light having a second polarization state at said second set of wavelengths;

said wavelength-selective retarder device comprising a tilted dichroic mirror, a tilted quarterwave retarder stacked over said tilted dichroic mirror, a tilted mirror stacked over said tilted quarterwave retarder, an untilted wavelength-selective linear polarizer positioned between said tilted dichroic mirror and said light splitting and combining device;

a first reflective light valve device, comprising one or more light valves, adapted to receive said first dark-state light and to produce a first bright-state light by rotating the polarization from said first polarization state to said second polarization state;

a second reflective light valve device, comprising one or more light valves, adapted to receive said second dark-state light and to produce a second bright-state light by rotating the polarization from said second polarization state to said first polarization state;

a light splitting and combining device positioned between said wavelength-selective retarder device and said first and second reflective light valve devices, said light splitting and combining device adapted to receive said first and second dark-state lights from said wavelength-selective retarder device and to direct said first and second dark-state lights to said first and second reflective light valve devices respectively, and adapted to receive said first and second bright-state lights reflected from said first and second reflective light valve devices respectively and to direct said first and second bright-state lights as a combined beam to a screen; and a wavelength-selective filtering device positioned to receive said combined beam containing said first and second bright-state lights from said light splitting and combining device and to substantially eliminate a residual dark-state light from said first and second light valve devices, wherein the wavelength-selective filtering device passes a beam containing all of red, blue and green primary color components of a color image which is projected onto the screen with improved contrast.

16. The projection display system of claim 15, said wavelength-selective filtering device comprising:

a wavelength-selective retarder adapted to rotate the polarization of either said first or second bright-state light by 90 degrees so that the said first and second bright-state lights have a common polarization, and a linear polarizer following said wavelength-selective retarder and adapted to substantially eliminate a light having a polarization orthogonal to the common polarization.

17. The projection display system of claim 15, said wavelength-selective filtering device comprising a first wavelength-selective polarizer adapted to block a light having said second polarization state at said second set of wavelengths while passing other lights having a polarization different from said second polarization or having a wavelength out of said second set of wavelengths.

18. The projection display system of claim 15, said wavelength-selective filtering device further comprising a second wavelength-selective polarizer adapted to block light having said first polarization state at said first set of wavelengths while passing other lights having a polarization different from said first polarization or having a wavelength out of said first set of wavelengths.

19. The projection display system of claim 15, further comprising:

a first color filter positioned between said light splitting and combining device and said first reflective light valve device, said first color filter adapted to absorb a light having a wavelength within said second set of wavelengths while passing a light having a wavelength within said first set of wavelengths, and a second color filter positioned between said light splitting and combining device and said second reflective light valve device, said second filter adapted to absorb a light having a wavelength within said first set of wavelengths while passing a light having a wavelength within said second set of wavelengths.

20. The projection display system of claim 15, wherein said light splitting and combining device includes:

a first face adapted to receive said illumination light from said light source;

a second face adapted to output said first and second bright-state lights;

a third face adapted to output said first dark-state light directed to said first reflective light valve device and to receive said first bright-state light reflected from said first reflective light valve device, and a fourth face adapted to output said second dark-state light directed to said second reflective light valve device and to receive said first bright-state light reflected from said second reflective light valve device.

21. The projection display of claim 15, wherein at least either one of said first and second reflective light valve devices includes a plurality of reflective light valves.

22. The projection display system of claim 15, wherein said first set of wavelengths of said first dark-state light includes first and second color bands and said second set of wavelengths of said second dark-state includes a third color band.

23. The projection display system of claim 15, wherein said first and second reflective light valve devices each contain a single illuminated light valve and comprise all light valves in the projection display system illuminated by said illumination light.

24. The projection display system of claim 15, wherein said wavelength-selective retarder device and said wavelength-selective filtering device are both positioned externally to said light splitting and combining device.

25. The projection system of claim 15, wherein said combining device is a cube combiner comprising two cemented right angle prisms with combining coatings on each side of the cemented hypotenuse.

26. The projection display system of claim 15, wherein the projection display system comprises a maximum of one light splitting and combining device.

27. The projection display system of claim 15, wherein the projection display system comprises a maximum of three light splitting and combining devices.

28. A projection display system comprising:

a light source adapted to supply an illumination light having common polarization at first and second sets of wavelengths;

a wavelength-selective retarder device positioned to receive said illumination light from said light source and to produce a first dark-state light having a first polarization state-at said first set of wavelengths and a second dark-state light having a second polarization state at said second set of wavelengths;

a first reflective light valve device, comprising one or more light valves, adapted to receive said first dark-state light and to produce a first bright-state light by rotating the polarization from said first polarization state to said second polarization state;

a second reflective light valve device, comprising one or more light valves, adapted to receive said second dark-state light and to produce a second bright-state light by rotating the polarization from said second polarization state to said first polarization state;

a light splitting and combining device positioned between said wavelength-selective retarder device and said first and second reflective light valve devices, said light splitting and combining device adapted to receive said first and second dark-state lights from said wavelength-selective retarder device and to direct said first and second dark-state lights to said first and second reflective light valve devices respectively, and adapted to receive said first and second bright-state lights reflected from said first and second reflective light valve devices respectively and to direct said first and second bright-state lights as a combined beam to a screen; and wherein said light splitting and combining device combines said first and second bright-state lights using a combining element that reflects visible light in said second polarization state that is in said first set of wavelengths, and that reflects visible light in said first polarization state that is not in said first set of wavelengths, and that transmits light in said second polarization state that is not in said first set of wavelengths;

a wavelength-selective filtering device positioned to receive said combined beam containing said first and second bright-state lights from said light splitting and combining device and to substantially eliminate a residual dark-state light from said first and second light valve devices, wherein the wavelength-selective filtering device passes a beam containing all of red, blue and green primary color components of a color image which is projected onto the screen with improved contrast.

29. The projection display system of claim 28, said wavelength-selective retarder device comprising a wavelength-selective retarder adapted to rotate the polarization of said illumination light at either said first or second sets of wavelengths by 90 degrees.

30. The projection display system of claim 28, said wavelength-selective filtering device comprising:

a wavelength-selective retarder adapted to rotate the polarization of either said first or second bright-state light by 90 degrees so that the said first and second bright-state lights have a common polarization, and a linear polarizer following said wavelength-selective retarder and adapted to substantially eliminate a light having a polarization orthogonal to the common polarization.

31. The projection display system of claim 28, wherein said wavelength-selective retarder device comprises a retarder stack adapted to rotate the polarization of said illumination light at either said first or second sets of wavelengths by 90 degrees, said retarder stack being followed by a wavelength-selective polarizer adapted to block a light having said second polarization at said first set of wavelengths, and said wavelength-selective filtering device comprises a wavelength-selective linear polarizer adapted to block a light having said second polarization at said second set of wavelengths, said wavelength-selective polarizer being followed by a combination of a dichroic retarder adapted to rotate the polarization of either said first or second bright-state light by 90 degrees so that said first and second bright-state light by 90 degrees so that said first and second bright light-state lights have a common polarization, and a linear polarizer adapted to substantially eliminate a light having a polarization orthogonal to the common polarization.

32. The projection display system of claim 28, further comprising:

a first color filter positioned between said light splitting and combining device and said first reflective light valve device, said first color filter adapted to absorb a light having a wavelength within said second set of wavelengths while passing a light having a wavelength within said first set of wavelengths, and a second color filter positioned between said light splitting and combining device and said second reflective light valve device, said second filter adapted to absorb a light having a wavelength within said first set of wavelengths while passing a light having a wavelength within said second set of wavelengths.

33. The projection display system of claim 28, wherein said light splitting and combining device includes:

a first face adapted to receive said illumination light from said light source;

a second face adapted to output said first and second bright-state lights;

a third face adapted to output said first dark-state light directed to said first reflective light valve device and to receive said first bright-state light reflected from said first reflective light valve device, and a fourth face adapted to output said second dark-state light directed to said second reflective light valve device and to receive said first bright-state light reflected from said second reflective light valve device.

34. The projection display of claim 28, wherein at least either one of said first and second reflective light valve devices includes a plurality of reflective light valves.

35. The projection display system of claim 28, wherein said first set of wavelengths of said first dark-state light includes first and second color bands and said second set of wavelengths of said second dark-state includes a third color band.

36. The projection display system of claim 28, wherein said first and second reflective light valve devices each contain a single illuminated light valve and comprise all light valves in the projection display system illuminated by said illumination light.

37. The projection display system of claim 28, wherein said wavelength-selective retarder device and said wavelength-selective filtering device are both positioned externally to said light splitting and combining device.

38. The projection system of claim 28, wherein said combining device is a cube combiner comprising two cemented right angle prisms with combining coatings on each side of the cemented hypotenuse.

39. The projection display system of claim 28, wherein the projection display system comprises a maximum of one light splitting and combining device.

40. The projection display system of claim 28, wherein the projection display system comprises a maximum of three light splitting and combining devices.

* * * * *